United States Patent [19]

Gallaway et al.

[11] Patent Number: 5,068,291

[45] Date of Patent: Nov. 26, 1991

[54] METHOD OF PREPARING PRESSURE SENSITIVE ADHESIVES WITH ACCELERATED CURE RATE

[75] Inventors: George L. Gallaway, Asbury; Paul B. Foreman, Somerville, both of N.J.

[73] Assignee: National Starch and Chemical Investment Holding Corporation, Wilmington, Del.

[21] Appl. No.: 498,199

[22] Filed: Mar. 22, 1990

[51] Int. Cl.$^5$ ............................................... C08F 8/42
[52] U.S. Cl. ................................. 525/366; 525/330.2; 525/330.6; 525/370
[58] Field of Search ................................ 525/366, 370

[56] References Cited

U.S. PATENT DOCUMENTS

| | | | |
|---|---|---|---|
| 3,258,443 | 6/1966 | Cantor et al. | 260/29.6 |
| 3,532,708 | 10/1970 | Blance | 260/31.2 |
| 3,632,546 | 1/1972 | Haung | 260/31.2 |
| 3,740,366 | 6/1973 | Sanderson et al. | 260/29.6 M |
| 3,769,254 | 2/1985 | Anderson et al. | 524/398 |
| 3,886,126 | 5/1975 | McKenna | 260/80.73 |
| 4,005,247 | 1/1977 | Graham | 526/15 |
| 4,185,051 | 1/1980 | McKenna et al. | 525/370 |
| 4,292,231 | 9/1981 | Gabriel et al. | 260/33.4 UR |

Primary Examiner—Bernard Lipman
Attorney, Agent, or Firm—Eugene Zagarella, Jr.; Edwin M. Szala

[57] ABSTRACT

This invention is a method of providing a pressure sensitive adhesive having a rapid or fast curing rate along with other suitable adhesive properties and comprises forming the adhesive by reaction of an interpolymer of an alkyl acrylate, ethylenically unsaturated monomer containing one or more carboxylic acid groups and vinyl acetate, with the interpolymer being formed by the slow addition of a uniform mixture of the components and then being reacted with a chelated metal alkoxide.

12 Claims, No Drawings

METHOD OF PREPARING PRESSURE SENSITIVE ADHESIVES WITH ACCELERATED CURE RATE

BACKGROUND OF THE INVENTION

This invention relates to a method of preparing rapid curing pressure sensitive adhesives comprising an acrylic interpolymer and a chelated metal alkoxide. These adhesives exhibit fast crosslinking cure rates while retaining good tack, cohesive strength and other adhesive properties making them useful in a number of applications, particularly those requiring rapid coating line speeds.

Pressure sensitive adhesives function to provide instantaneous adhesion when applied under light pressure. They are characterized by having a builtin capacity to secure this adhesion to a surface without activation, such as by treatment with solvents or heat, and also desirably having sufficient internal strength so that the adhesive material will not rupture before the bond between the adhesive material and the surface ruptures The capacity to obtain instantaneous adhesion is usually expressed as the amount of "track" or "tackiness." Ordinarily it is desirable to obtain as much tack as possible without losing a significant amount of internal strength (cohesion). The latter balance of adhesive and cohesive properties has been difficult to obtain in adhesive polymers since modifications to increase the cohesive strength generally result in a decrease in adhesive tack.

Pressure sensitive adhesive systems based on acrylic interpolymers and typically applied to substrates from solutions have been developed over more than thirty years. Such adhesives generally have been found to have suitable tack and cohesive properties as well as possessing other adhesive properties required for specific applications. U.S. Pat. No. B1 3,769,254 issued Feb. 26, 1985 discloses pressure sensitive adhesives formed by reacting a metal alkoxide with an interpolymer comprised of an alkyl acrylate, an acrylic monomer containing a reactive hydrogen atom and a copolymerizable ethylenically unsaturated monomer. U.S. Pat. No. 4,185,051 issued Jan. 22, 1980 discloses acrylic interpolymers containing hydroxyl or carboxyl groups reacted with poly (metaloxane) as pressure sensitive adhesive with improved color, cohesive strength and tack. U.S. Pat. No. 3,740,366 issued June 19, 1973 shows adhesive prepared polymers containing a carboxylic acid group and crosslinked with a polyvalent metal. U.S. Pat. No. 4,292,231 issued Sept. 29, 1981 discloses pressure sensitive adhesives having improved cohesive strength formed by reacting acrylic interpolymers containing a vinyl monomer having both a carboxyl and carbonate functional group with a metal alkoxide. U.S. Pat. No. 3,886,126 issued May 27, 1975 shows pressure sensitive resin solutions containing chelate esters of orthotitanic acid and interpolymers having an hydroxyl, carboxyl or enolizable keto group. U.S. Pat. No. 3,532,708 issued Oct. 6, 1970 discloses rapid room temperature curable pressure sensitive adhesive resins comprising an interpolymer which includes an hydroxyl bearing acrylate, methacrylate, maleate or fumarate monomer and a metal alkoxide. U.S. Pat. No. 4,005,247 issued Jan. 27, 1977 discloses pressure sensitive adhesives with improved cohesive strength and good tack formed by reacting an acrylic interpolymer of an alkyl acrylate and ethylenically unsaturated acid anhydride with a metal alkoxide.

The above noted disclosures show various pressure sensitive adhesives which provide different property characteristics, especially cohesive strength and tack, making them useful in a number of applications. However, there are other applications which require improved conditions such as an accelerated crosslink curing rate to provide faster processing operations and avoid problems such as cold flow or adhesive edge ooze.

SUMMARY OF THE INVENTION

This invention involves a method of providing a pressure sensitive adhesive having a fast crosslink curing rate along with good adhesive and cohesive properties. More particularly, the method of this invention provides a pressure sensitive adhesive composition formed by the reaction of:
(A) a normally tacky interpolymer of:
 (1) at least about 40 percent by weight of one or more alkyl acrylates having about 1 to 18 carbon atoms in the alkyl groups,
 (2) from about 0.2 to 20 percent by weight of an ethylenically unsaturated monomer containing one or more carboxylic acid groups, and
 (3) from about 5 to 59.8 percent by weight of vinyl acetate, said interpolymer being formed by the slow addition of a uniform mixture of the above components to the reaction kettle, and
(B) a chelated metal alkoxide having the formula $R_nT(OR_1)_z$ wherein T is a metal selected from the group consisting of Groups II, III, IV and V and the transition metals of the Periodic Table, R is selected from the group consisting of alkyl radicals of from 1 to 8 carbon atoms and aryl radicals of from 6 to 16 carbon atoms, $R_1$ is selected from the group consisting of aliphatic and substituted aliphatic radicals containing from 1 to 18 carbon atoms, n is an integer whose value is 0 or greater and z is an integer whose value is at least 2 wherein the sum of n+z is greater than 1 and is equal to the valence of the metal represented by T.

DETAILED DESCRIPTION OF THE INVENTION

The fast curing pressure sensitive adhesives prepared in accordance with the method of this invention are adhesive polymers formed from acrylic interpolymers and chelated metal alkoxides. While adhesives of this type have been known for some time as noted in the above patents, they typically use a polymerization process wherein the monomers are added slowly in proportions which take into account their different reactivity ratios in order to obtain a more or less uniform interpolymer. In other words, where dissimilar reacting monomers are involved, the less reactive monomer is heavily proportioned in the initial charge while slowly adding the more reactive monomers to achieve a more uniform copolymerization. In contrast to this, it has been found that by slowly adding a uniform mixture of all the interpolymer components, i.e., the same proportion of slow and faster reacting monomers is added throughout the polymerization, the resulting adhesives have a surprisingly increased curing rate. That the heterogeneous interpolymer resulting from such a process would have an increased cure rate is unexpected.

The acrylic interpolymer used in the reaction with a chelated metal alkoxide comprises a faster reacting acrylic component which includes an alkyl acrylate and a carboxylic acid containing monomer and a slower reacting vinyl acetate component. This interpolymer is formed of monomers comprising one or more alkyl acrylates, generally containing up to about 18 carbon atoms in the alkyl group, along with a small proportion of a monomer having at least one carboxylic acid group. Additionally, the interpolymer will contain an ethylenically unsaturated monomer, more particularly vinyl acetate.

The alkyl acrylates which form a major essential constituent of the interpolymer are preferably acrylic acid esters of alcohols having about 1 to 18 carbon atoms. The more particularly preferred alkyl acrylates have an average of from about 4 to about 10 carbon atoms in the alkyl groups. Illustrative alkyl acrylates include butyl acrylate, amyl acrylate, hexyl acrylate, heptyl acrylate, octyl acrylate, nonyl acrylate, decyl acrylate, and various isomers of these acrylates, such as isooctyl acrylate. Particularly preferred alkyl acrylates for use in the invention are 2-ethylhexyl acrylate and butyl acrylate (e.g., n-butyl acrylate and isobutyl acrylate). Higher alkyl acrylates can in some instances be used, particularly in combination with the lower alkyl acrylates, whereby the average number of carbon atoms in the alkyl groups is within the desired range.

In most cases it is necessary to have at least about 40 percent by weight of the interpolymer consist of the above described alkyl acrylates and in many preferred interpolymers, 60 percent or more are made up of these monomers.

The ethylenically unsaturated monomer containing at least one carboxylic acid group includes acrylic acid and methacrylic acid which are preferred and other copolymerizable acids such as crotonic acid, itaconic acid and fumaric acid. Carboxylic acid functionality may also be generated by the ring opening of a suitable acid anhydride such as maleic anhydride and itaconic anhydride. Half esters of unsaturated dicarboxylic acids such as monomethyl fumarate, monobutyl fumarate, monoethyl maleate and monobutyl maleate can also be used.

At least about 0.2 percent by weight of the interpolymer is comprised of the monomer containing a carboxylic acid group and such monomer is usually present in an amount of from about 0.2 to 20% by weight of the total weight of the interpolymer and preferably from about 3.0 to about 10%.

Additionally monomers containing other reactive hydrogen atoms may be used. By "reactive hydrogen atom" is meant monomers containing a pendant functionality such as hydroxyl (OH) or carboxylic acid (COOH) which are capable of crosslinking with a metal alkoxide. Such additional monomers containing reactive hydrogen atoms include hyroxyalkyl esters of ethylenically unsaturated acids. Examples include 3-hydroxyethyl acrylate, 3- hydroxypropyl acrylate, 2-hydroxyethyl methacrylate and corresonding esters of other unsaturated acids. There may also be employed mono- or di-esters of unsaturated dicarboxylic acids such as maleic and itaconic acid in which at least one of the esterfying groups contain a hydroxyl group.

There is also includes in the adhesive up to about 59.8 percent by weight of a vinyl ester of a saturated carboxylic acid such as vinyl acetate. More particularly from about 5 to 59.8 percent by weight and preferably from about 10 to 40 percent by weight of vinyl acetate is included in the adhesive.

It will be recognized that the ratio of monomers in the interpolymer will be selected to provide a normally tacky pressure sensitive material. Generally, the ratio of monomers in the interpolymer is selected so that the glass transition temperature is less than 0° C. and more particularly in the range of about $-15°$ to $-75°$ C. A suitable ratio is conventionally calculated from the equation.

$$1/Tg = W_1/Tg_1 + W_2/Tg_2 + \ldots W_n/Tg_n$$

where Tg is the glass transition temperature of the interpolymer expressed in degrees Kelvin, $Tg_1$, $Tg_2$ etc., are the glass transition temperatures of the homopolymers of the respective comonomers and $W_1$, $W_2$ etc., are the weight fractions of comonomers required for a specific glass transition temperature of the interpolymer. A suitable source for glass transition temperatures of the homopolymers is the Polymer Handbook, second Edition, Edited by J. Brandrup and S. H. Immergut, John Wiley and Sons, New York, 1975, Chapter III, 143-179. Glass transition temperatures are determined experimentally by conventional methods such as by means of the duPont Differential Thermal Analyzer, wherein e.g. at a heating rate of 20° K per minute, the Tg is taken as the mid-point of the discontinuity of the differential temperature curve.

The interpolymers are conveniently prepared by organic solvent polymerization techniques. The techniques involve the polymerization of the respective monomer mixture in suitable organic solvents, the polymerization being initiated by heat activated free radical initiators.

Examples of suitable solvents for the interpolymers include aromatic solvents such as benzene, toluene, xylene, etc. Suitable aliphatic solvents include esters such as ethyl acetate, propyl acetate, isopropyl acetate, butyl acetate, etc.; ketones such as methyl ethyl ketone, acetone, etc.; aliphatic hydrocarbons such as hexane, heptane, etc. Especially useful are mixtures of the foregoing.

Polymerization initiators suitable for the preparation of the special interpolymers of this invention include organic peroxides, such as tert-butyl hydroperoxide, di-tert-butylperoxide, cumene hydroperoxide, di-cumyl peroxide, benzoyl peroxide and the like. Equally suitable are organic peroxygen compounds such as tert-butyl peracetate, tert-butyl perbenzoate, di-tert-butyl perphthalate and azo compounds such as 2,2'-azobis(2-methyl propanenitrile). The choice of initiator depends on the temperature of polymerization and is readily selected by the practitioner skilled in the art.

The interpolymer, as described above, is reacted with a chelated metal alkoxide to provide the adhesive polymer employed in the invention.

The metal alkoxides which may be used herein may be any metal alkoxide such as those having the formula $R_nT(OR_1)_z$, wherein T is a metal selected from the group consisting of Groups II, III, IV and V and the transition metals of the Periodic Table; $R_n$ is selected from the group consisting of alkyl radicals of from 1 to 8 carbon atoms such as methyl, ethyl, butyl, iso-octyl and the like and aryl radicals of from 6 to 16 carbon atoms such as benzyl. $R_1$ is selected from the group consisting of aliphatic and substituted aliphatic radicals containing from 1 to 18 carbon atoms. such as alkyl groups, allyl groups and the like; n is an integer whose value is zero or greater and z is an integer of at least 2, wherein the sum of n+z is greater than one (1) and is equal to the valence of the metal represented by T. Also included as metal alkoxides which may be used are the double metal alkoxides such as the alkali metal and alkaline earth metal compounds thereof.

Examples of metal alkoxides for use in the practice of this invention include the following: magnesium ethoxide, calcium ethoxide, strontium ethoxide, barium ethoxide, aluminum ethoxide, aluminum isopropoxide, lanthanum t-butoxide, ferric ethoxide, ferric isopropoxide. titanium ethoxide, titanium isopropoxide, titanium butoxide, cupric isopropoxide. cobaltic isopropoxide, zinc isopropoxide, nickel isopropoxide. zirconium ethoxide, zirconium isopropoxide, zirconium butoxide, hafnium ethoxide. hafnium isopropoxide, cerium isopropoxide, germanium isopropoxide, stannic ethoxide, stannic isopropoxide, vanadium isopropoxide, chromium t-butoxide, niobium ethoxide, niobium isopropoxide; also included are double alkoxides such as sodium zirconium isopropoxide, potassium zirconium ethoxide, magnesium aluminum ethoxide, potassium aluminum butoxide, sodium stannic ethoxide and alkyl metal alkoxides such as diethoxy ethyl aluminum, dibutoxy diphenyl titanium, phenyl triisopropoxy titanium, dimethyl dissopropoxy titanium, dibutyl dimethoxy tin and the like.

The preferred metal alkoxides are aluminum isopropoxide or titanium esters such as alkyl titanates and ortho titanic acid esters of monofunctional alcohols and tetraaryl esters. Examples of alkyl titanates include tetramethyl titanate, tetraethyl titanate, tetrapropyl titanate, tetraisopropyl titanate, tetrabutyl titanate, tetra-2-ethyl-hexyl titanate, and tetrastearyl titanate. As indicated, tetraphenyl titanate and other tetraaryl esters are also included.

The chelated metal alkoxides which are used in this invention are formed by coordinated bonding between the metal, e.g. titanium and electron donating atoms, such as oxygen or nitrogen. Thus, the reaction of alkyl esters of titanic acid with amino alcohols, keto alcohols, glycols, or similar polyfunctional alcohols as the ligands, particularly acetyl acetone (2,4pentanedione), causes replacement of at least two of the alkoxy groups of the ester with at least 2 moles of the ligand. Although these chelated metals are not pure compounds and may be partially polymerized by intermolecular alcoholysis, they can be represented by the following generalized formula:

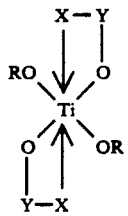

In the above formula, X is oxygen or nitrogen, Y is an alkylene radical of 2 to 3 carbon atoms, and each R is an alkyl of up to about 12 carbon atoms or XYOH. Such chelated metals can be formed by various methods, such as by reaction of a tetraalkyl titanate with a glycol, such as 2-ethyl-1,3-hexanediol; a diketone, such as 2,4-pentanedione; a hydroxy acid, such as lactic acid, citric acid, or tartaric acid; a keto ester, such as acetoacetic ester; or with an aminoalcohol, such as diethanolamine or triethanolamine. The preparation of such chelated metals is described in U.S. Pat. Nos. 2,453,520, 2,468,916, 2,870,181 and 2,824,114, and in British Pat. No. 74,113.

The preferred chelated metals employed in the invention are those which are commercially available, which include those formed from octylene glycol, triethanolamine, 2,4-pentanedione, and lactic acid. Thus completely chelated metals such as titanium acetylacetonate, or aluminum tris(acetylacetonate) when added to the interpolymer solution form a more stable, latently crosslinkable solution, which upon evaporation of solvent forms a crosslinked polymer matrix.

It is noted that the chelating agent such as the glycol, hydroxy acid, keto ester or aminoalcohol may also be added to the composition as an excess to achieve better stability. Small excesses such as 1 or 2 percent (based on polymer solids) of the chelating agents have been found to be extraordinarily effective.

The relative proportions of acrylic interpolymer and the chelated metal alkoxide employed in producing the adhesive polymers of the invention can be varied and depend to some extent upon the nature of the interpolymer and the particular chelated metal alkoxide utilized. In most cases, however, there is employed from about 0.01 to 5 percent and preferably from about 0.1 to 1 percent by weight of the chelated metal alkoxide based on the total polymer.

The reaction between the chelated metal alkoxide and the acrylic interpolymer is partially completed under conditions typically used in an adhesive coating line, i.e., at practical production line speeds and moderate temperatures, such as 50° to 135° C. Full cure takes place in the finished coating over the ensuing one or more days under ambient conditions. It may be desired, in some instances, to obtain improved adhesion by having a stoichiometric excess of carboxylic acid groups over those required to complete the cure.

The important feature of the method of this invention, as noted above, does not reside in the proportions or ratios of the monomers thereof or in the reaction of the interpolymer with the chelated metal alkoxide. Rather, the essential or main feature of this invention resides in the ability to provide an adhesive with an increased curing rate by using the slow addition of a uniform mixture of all the interpolymer components, i.e., the same proportion of the slow reacting vinyl acetate and the faster reacting monomer is added throughout the polymerization. This in essence results in a heterogeneous polymerization as distinct from the conventionally practiced technique of a uniform homogeneous polymerization where the monomers are added in different proportions in relation to their degree of reactivity, i.e., the less reactive monomers concentrated in the initial charge and the more reactive monomers being slow added. The significance of this difference is the resulting increased curing rate found in the method of this invention wherein a uniform mixture giving heterogeneous copolymerization was used. This was evidenced by the higher plasticity number ($PN_c$), i.e., Williams plasticity number that resulted after a short cure cycle or oven bake. The increased curing rate which resulted was achieved without adversely affecting the tack and cohesive properties as well as other important characteristics of the pressure sensitive adhesive. The ability to provide a faster curing or crosslinking adhesive is important to the user since it allows faster coating line speed or increased production and also overcomes the adhesive oozing or cold flow that often occurs when further processing is attempted before cure is complete.

It will be apparent that various changes and modifications can be made in the embodiments of the invention described above, without departing from the scope as defined. The following examples are further illustrative of this invention and are not intended to be construed as limitations thereof. In the examples, all parts and percentages are by weight and all temperatures in degrees Celsius, unless otherwise noted.

EXAMPLE 1

A mixture comprising 58 parts of 2-ethylhexyl acrylate, 18 parts of isobutyl acrylate, 5 parts of acrylic acid and 19 parts of vinyl acetate was prepared and further identified below as Monomer Mix "A".

An initial charge of 10 parts of Monomer Mix "A", 10 parts of ethyl acetate and 5 parts of toluene along with 0.02 parts of initiator Vazo-64, a duPont trademark for 2,2'-azobis(2-methyl propanenitrile) was made to a reactor. This charge was heated to reflux and held there for 10 minutes. Ninety (90) parts of Monomer Mix "A" was uniformly added over 2.5 hours and a catalyst mixture comprising 5 parts of toluene, 14 parts of ethyl acetate and 0.25 parts of Vazo-64 was uniformly added over 3.25 hours. Ten minutes after the addition of Monomer "Mix A" was complete, 14 parts of heptane was added uniformly over 2 hours.

After the heptane addition was completed, the reaction mixture was held at reflux for 30 minutes, cooled to 50° C. and 15 parts of heptane, 5 parts of toluene and 40 parts of isopropyl alcohol added.

A mixture comprising 0.215 parts of aluminum isopropoxide, 0.645 parts of 2,4-pentanedione and 3.44 parts of toluene were added. The Williams plasticity number, a number that results from a well known plasticity test that measures the overall cohesive and flow properties of pressure sensitive materials was determined for the mixture. The test is based on the ASTM procedure D-926-67 in which a two gram ball of sample is placed in a Williams plastometer. The oven or test chamber is set at 100° F. and a stress load of 5 kg is used. The sample is placed between the plastometer plates and allowed to reach thermal equilibrium. In these examples the Williams plasticity number was determined on the uncured adhesive taken before the addition of the chelated metal alkoxide, $PN_u$, on a sample containing chelated metal alkoxide after it received a short cure of three minutes, $PN_c$, and on the latter sample after it was baked for 1 hour at 165° C. to accelerate the cure and simulate a final or ultimate cure, $PN_f$.

In this example, the uncured adhesive had a plasticity $PN_u$ of 1.29 mm and a plasticity number after a short cure $PN_c$ of 1.91 mm showing an increase of 0.62 over this short curing time. The final accelerated cure $PN_f$ was 2.60 mm. The sample was found to have a percent solids of 45.0, a viscosity of 2160 cps at 72° F., an intrinsic viscosity (IV) of 0.72 as measured in toluene and peel strength, tack and shear adhesion which were comparable to those properties as found in pressure sensitive adhesives typically and commercially used.

EXAMPLE 2

For comparison purposes, an adhesion composition was prepared in a similar manner as in Example 1 but with all of the vinyl acetate added with the initial charge. In this example, a mixture comprising 58 parts of 2-ethylhexyl acrylate, 18 parts of isobutyl acrylate, and 5 parts of acrylic acid was prepared and further identified below as Monomer Mix "B".

An initial charge of 19 parts of vinyl acetate, 8 parts of Monomer Mix "B", 10 parts of ethyl acetate and 7.5 parts of toluene along with 0.02 parts of initiator Vazo-64 was made to a reactor. Seventy-three (73) parts of Monomer Mix "B" was uniformly added over 2.5 hours and a catalyst mixture comprising 2.5 parts of toluene, 14 parts of ethyl acetate and 0.25 parts of Vazo-64 was uniformly added over 3.25 hours. Ten minutes after the addition of Monomer Mix "B" was complete, 14 parts of heptane was added uniformly over 2 hours.

After the heptane addition was completed, the reaction mixture was held at reflux for 30 minutes, cooled to 50° C. and 15 parts of heptane, 5 parts of toluene and 40 parts of isopropyl alcohol added.

A mixture comprising 0.215 parts of aluminum isopropoxide, 0.645 parts of 2,4-pentanedione and 3.44 parts of toluene were added. The resulting product gave an uncured plasticity number $PN_u$ of 1.29 mm (indicating similar molecular weight to the polymer produced in Example 1) and a $PN_c$ after a short cure of 1.59 mm showing an increase of only 0.3. This showed the advantageous increase in curing rate of the adhesive prepared using the uniform addition in accordance with the method of this invention as shown in Example 1.

EXAMPLE 3

An additional adhesive was prepared in a manner similar to Example 1 with the monomer mix added over a 2 hour period and the catalyst added over 3 hours.

The resulting adhesive had an uncured plasticity number $PN_u$ of 1.46 mm and a $PN_c$ after a short cure of 2.0 mm. The faster monomer addition normally results in a higher polymer molecular weight as indicated by the higher uncured $PN_u$. The final $PN_f$ was 3.0 mm, percent solids was 45.0, viscosity 4280 cps and IV was 0.72.

EXAMPLE 4

Another adhesive was prepared in a similar manner to Example 1 with the monomer mix added over 3.5 hours and the catalyst over 4.5 hours.

The adhesive had an uncured $PN_u$ of 1.25 mm, a $PN_c$ of 1.75 mm, a final $PN_c$ of 2.85 mm, a percent solids of 45.0, a viscosity of 3170 cps and an IV of 0.59.

EXAMPLE 5

Another adhesive similar to Example 1 was prepared replacing the isobutyl acrylate monomer with n-butylacrylate.

The resulting adhesive had an initial $PN_u$ of 1.1 mm, a $PN_c$ after a short cure of 2.42 mm and a final $PN_f$ of 2.86 mm. The percent solids was 44.1, viscosity 1130 cps and IV was 0.50.

What is claimed is:
1. In a method of preparing a pressure sensitive adhesive by reacting:
   (A) a normally tacky interpolymer of:
      (1) at least about 40 percent by weight of one or more alkyl acrylates having about 1 to 18 carbon atoms in the alkyl group,
      (2) from about 0.2 to 20 percent by weight of an ethylenically unsaturated monomer containing one or more carboxylic acid groups, and
      (3) from about 5 to 59.8 percent by weight of vinyl acetate, and

(B) a chelated metal alkoxide having the formula $R_nT(OR_1)_z$ wherein T is a metal selected from the group consisting of Groups II, III, IV and V and the transition metals of the Periodic Table, R is selected from the group consisting of alkyl radicals of from 1 to 8 carbon atoms and aryl radicals of from 6 to 16 carbon atoms, $R_1$ is selected from the group consisting of aliphatic and substituted aliphatic radicals containing from 1 to 18 carbon atoms, n is an integer whose value is 0 or greater and z is an integer whose value is at least 2 wherein the sum of n+z is greater than 1 and is equal to the valence of the metal represented by T, the improvement comprising providing a pressure sensitive adhesive having a fast curing rate by first forming the interpolymer by the slow addition of a uniform mixture of all the (A) components including the slower reacting vinyl acetate and the faster reacting alkyl acrylate and ethylenically unsaturated carboxylic acid containing monomer to the reaction kettle.

2. The method of claim 1, wherein said alkyl acrylates have an average of from about 4 to 10 carbon atoms in the alkyl groups.

3. The method of claim 2, wherein said carboxylic acid containing monomer is acrylic or methacrylic acid.

4. The method of claim 3, wherein from about 3.0 to 10% of said carboxylic acid containing monomer is used.

5. The method of claim 2, wherein from about 0.01 to 5% by weight of the chelated metal alkoxide based on the total polymer weight is used.

6. The method of claim 5, wherein at least about 60 percent by weight of said alkyl acrylate is used.

7. The method of claim 6, wherein aluminum or titanium used in the metal alkoxides.

8. The method of claim 7, wherein said alkyl acrylate is 2-ethylhexyl acrylate or butyl acrylate.

9. The method of claim 4, wherein at least about 60 percent by weight of said alkyl acrylate is used.

10. The method of claim 9, wherein from about 0.01 to 5% by weight of the chelated metal alkoxide based on the total polymer weight is used.

11. The method of claim 10, wherein said acrylate is 2-ethylhexyl acrylate or butyl acrylate.

12. The method of claim 11, wherein aluminum or titanium is the metal used in the metal alkoxides.

* * * * *